United States Patent
Matityaho

(10) Patent No.: US 11,030,572 B2
(45) Date of Patent: Jun. 8, 2021

(54) SYSTEM AND METHOD FOR MANAGING INVENTORY OF CONSUMABLE ARTICLES

(71) Applicant: LOGITAG SYSTEMS LTD, Netanya (IL)

(72) Inventor: Shlomo Matityaho, Tel Mond (IL)

(73) Assignee: LogiTag Systems LTD., Netanya (IL)

( * ) Notice: Subject to any disclaimer, the term of this patent is extended or adjusted under 35 U.S.C. 154(b) by 0 days.

(21) Appl. No.: 15/276,699

(22) Filed: Sep. 26, 2016

(65) Prior Publication Data

US 2017/0011337 A1  Jan. 12, 2017

Related U.S. Application Data

(63) Continuation-in-part of application No. PCT/IL2015/050311, filed on Mar. 25, 2015.

(60) Provisional application No. 61/969,921, filed on Mar. 25, 2014.

(51) Int. Cl.
*G06Q 10/08* (2012.01)
*G06Q 10/10* (2012.01)

(52) U.S. Cl.
CPC .......... *G06Q 10/087* (2013.01); *G06Q 10/08* (2013.01); *G06Q 10/10* (2013.01)

(58) Field of Classification Search
USPC ................................. 235/375, 385; 439/495
See application file for complete search history.

(56) References Cited

U.S. PATENT DOCUMENTS

| | | | |
|---|---|---|---|
| 6,658,322 B1 | 12/2003 | Frederick et al. | |
| 2002/0070846 A1 | 6/2002 | Bastian, II et al. | |
| 2002/0115341 A1* | 8/2002 | Hein | H01R 25/14 439/495 |
| 2004/0124988 A1 | 7/2004 | Leonard et al. | |
| 2007/0171462 A1* | 7/2007 | Shoya | G06Q 10/06 358/1.15 |
| 2007/0215700 A1* | 9/2007 | Reznik | G06Q 10/08 235/385 |
| 2009/0099943 A1 | 4/2009 | Bodin et al. | |
| 2009/0309736 A1 | 12/2009 | Heurtier | |
| 2011/0087566 A1* | 4/2011 | Sanchez Maulini | G06Q 10/087 705/28 |
| 2013/0068833 A1* | 3/2013 | Matityaho | G06Q 10/087 235/375 |

(Continued)

FOREIGN PATENT DOCUMENTS

WO  2015145437 A1  10/2015

OTHER PUBLICATIONS

International Preliminary Report on Patentability for PCT Application No. PCT/IL2015/050311 dated Sep. 27, 2016 (5 pages).

(Continued)

*Primary Examiner* — Peter Ludwig
*Assistant Examiner* — Reva R Moore
(74) *Attorney, Agent, or Firm* — Knobbe, Martens, Olson & Bear, LLP

(57) ABSTRACT

Stock cards with machine readable tags are placed on article packaging in a point of inventory. When an employee wishes to order an article, the employee selects a state switch on the stock card to place an order for a predefined quantity. The machine readable tag of the stock card generates an order for a predefined quantity of the identified article. The order is sent to a fulfillment server which processes the order and sends it to the appropriate supplier.

20 Claims, 10 Drawing Sheets

(56) References Cited

U.S. PATENT DOCUMENTS

2016/0085999 A1* 3/2016 Oppenheimer ........ G06Q 10/08
726/35

OTHER PUBLICATIONS

International Search Report for PCT Application No. PCT/IL2015/050311 dated Jun. 2, 2015.
Written Opinion for PCT Application No. PCT/IL2015/050311 dated Jun. 4, 2015.

* cited by examiner

Local installation

SYSTEM AND METHOD FOR MANAGING INVENTORY OF CONSUMABLE ARTICLES

CROSS REFERENCE TO RELATED APPLICATIONS

This application is Continuation in Part of International Application No. PCT/IL2015/050311, filed Mar. 25, 2015, designating the U.S. and published as WO 2015/145437 A1 on Oct. 1, 2015, which claims the benefit of U.S. Provisional Patent Application No. 61/969,921, filed Mar. 25, 2014; the entireties of which are hereby incorporated by reference.

TECHNICAL FIELD

The present disclosure relates to managing inventory in general and in particular to managing inventory of consumable articles.

BACKGROUND ART

Facilities like storage rooms in hospitals, fast food chains, retail store chains, logistics centers, group of purchasing organizations and the like use large quantities of consumable articles on a daily basis and thus constantly need to track the status of such consumable articles and make sure sufficient quantities of each product are ordered on time so that these articles are always available when needed.

In many cases, the consumable articles are stocked in a plurality of supply rooms in the facility (or in individual retail stores and the like) where they are readily available for use. Those articles are usually not controlled on a per "item level" but on a bulk level, and the usage of the individual article is not reported to the information systems, for example, a package of 100 napkins (or 40 toilet paper rolls) as opposed to tracking napkins or toilet paper rolls individually. As a result, not having usage information for an article can create a situation in which the store room faces Out Of Stock (OOS) situations for an article, including sometimes of critical articles. In order to avoid OOS, the organization typically needs to spend considerable time in counting and creating complex and inefficient reporting mechanisms for inventory control and on-time reordering. The daily counting or replenishment requests are usually sent to the organization's central storage area or logistics center for replenishment. A central supply room (or central storage area) may receive all the orders fulfilled by the different suppliers. The orders are then dispatched from the central supply room/center to the different supply rooms, retail stores etc.

In other instances, the supply room can be a retail supply room, a retail store, supermarket, department store etc. or any similar location which manages inventory of articles.

SUMMARY

It is an object of the present disclosure to disclose a system and method for managing the reordering location and inventory level of articles.

It is another object of the present disclosure to disclose a system and method for managing the reordering location and inventory level of articles with no need to manually report to information system the usage of an article.

It is a further object of the present disclosure to disclose a system and method for managing inventory of consumable and reordering point articles with just in time (JIT) restocking.

It is yet another object of the present disclosure to disclose a system and method for managing inventory of consumable and reordering point (location) articles with just in time (JIT) restocking methodology.

It is yet a further object of the present disclosure to disclose a system and method for managing inventory and reordering point of consumable articles by using existing storeroom shelving.

It is yet another object of the present disclosure to disclose a system and method for managing inventory of consumable and reordering point articles with low capital investment on existing storage solutions and facility.

It is yet a further object of the present disclosure to disclose a system of method where an employee can order an item without using a computer system.

It is yet another object of the present disclosure to disclose a system of method where an employee can immediately recognize if an item has been ordered without using a computer system.

The present disclosure thus relates to a computerized system comprising a processor and memory for ordering and receiving articles in a point of inventory, the system comprising:

(i) a plurality of stock cards, each stock card comprising:
  a) a machine readable tag, configured to be removably attached to an article packaging and associated with a predetermined ordering quantity of said article;
  b) an Electronic Paper Display (EPD) panel adapted for displaying article information on each stock card;
  c) one or more state switches for selecting at least one state for placing an order for said articles;
(ii) at least one active reader for wirelessly reading said machine readable tags; and
(iii) a fulfillment server comprising a processor and memory units connected to said at least one active reader for receiving orders to be fulfilled from the machine readable tags of the stock cards and transferring said orders to be fulfilled to a fulfillment server,
wherein when an employee wishes to order a predetermined quantity of an article the employee deploys the state switch on the stock card to indicate placing an order, the machine readable tag of the stock card then transmits an order for the quantity and article associated with the stock card to the fulfillment server which processes the order and sends for execution with a supplier.

In some embodiments the machine readable tag is a passive Radio Frequency Identification (RFID) tag.

In some embodiments the machine readable tag is an active RFID tag.

In some embodiments the one or more state switches comprise two states: one for placing an order to be fulfilled for a certain quantity of a product, and the other for placing an urgent order to be fulfilled for a certain quantity of a product.

In some embodiments the one or more state switches are push buttons.

In some embodiments the one or more state switches comprise a visual indicator to indicate the selected state.

In some embodiments the one or state switches can be reset after an order is fulfilled.

In some embodiments the at least one tag reader is connected to the fulfillment server via a wired or wireless connection or both.

In some embodiments the person delivering the fulfilled product to the supply room first identifies himself before changing the state of the one or more state switches.

In some embodiments the person identifies himself by having his personal card authenticate itself to a stocking card.

In some embodiments the stock card can be configured remotely.

In some embodiments the article information displayed on the EPD panel comprises one or more of the following items: article name, price, number of units to be ordered, manufacturer name, catalog number, storage location in the supply room, barcode, article description, photo of the article, the date an order was placed, status of order, or date the order is expected to be fulfilled.

In some embodiments the fulfillment server sends orders to a facility server and the facility server sends the orders to the appropriate suppliers.

In another aspect the present disclosure further relates to computerized method for ordering and receiving articles in a supply room of a facility, the method comprising the steps of:

(i) configuring a plurality of stock cards each to identify a predetermined quantity of a predetermined article, each stock card comprising:

a) a machine readable, configured to be removably attached to an article packaging and identify a predetermined ordering quantity of said article;

b) an Electronic Paper Display (EPD) panel adapted for displaying article information on each stock card;

c) one or more state switches for selecting at least one state indicating placing an order for said article;

(ii) reading said machine readable tags wirelessly by an active reader; and (iii) transmitting said order to a fulfillment server comprising a processor and memory units connected to said active reader, and further transferring said orders to be fulfilled to a supplier, wherein when an employee wishes to order a predetermined quantity of a product the employee deploys the state switch on the stock card to indicate placing an order, the machine readable tag of the stock card then transmits an order for the quantity and article associated with the stock card to the fulfillment server which processes the order and sends it to a supplier.

DETAILED DESCRIPTION

Figure 1:
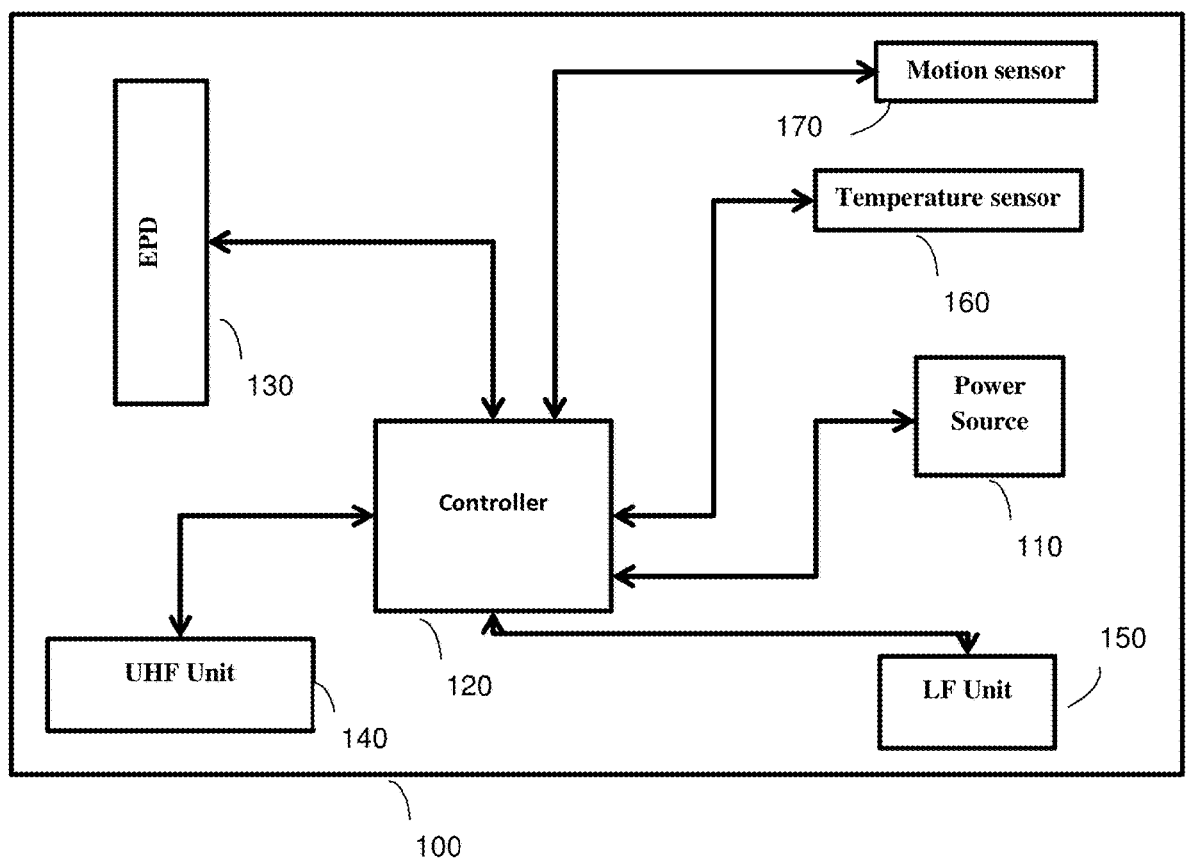
FIG. 1 shows a stock card block diagram.

In the following detailed description of various embodiments, reference is made to the accompanying drawings that form a part thereof, and in which are shown by way of illustration specific embodiments in which the disclosure may be practiced. It is understood that other embodiments may be utilized and structural changes may be made without departing from the scope of the present disclosure.

The present disclosure relates to an inventory management and fulfillment system for ordering and receiving articles in a place of inventory, for example, in a supply room of a facility, in a retail store etc. The term "supply room in a facility" should be understood in a broad sense such as a supply room of any location such as a hospital, an individual store within a chain of stores etc. In general, the disclosure relates to managing multiple, geographically separated inventory locations (supply rooms). The supply rooms can be in different locations or even different rooms in the same building or complex of buildings.

The inventory system is suited to manage inventory of any commercial and none commercial articles, for example, consumable articles, typically ordered in bulk, such as hospital consumables (pads, syringes . . . ), fast food articles (napkins, cups, buns . . . ), any article sold in a retail store, supermarket etc. Such articles are typically ordered by regular employees such as a nurse or a retail employee, and the availability of such articles are important for the quality of service of the establishment in question.

One of the advantages of the system of this disclosure is that inventory inspection and article ordering can be done quickly and without the use of a computer. An employee entering the supply room inspects the article packagings and can immediately identify articles that have been ordered by inspecting a tag attached to an article packaging. In order to place an order for an article, the employee does not need to log to a computer, identify himself, select an article, select quantity to be ordered, request permission etc. All these actions consume time, require capital investment for the material and require time to train the employee. Errors can also happen more frequently, for example, the employee might select a similar but not identical product on the computer system, typically when many similar products exists (difference in size, material, color etc.). Using the system of this disclosure, all the employee has to do is manipulate a state switch on the stock card attached to an article packaging. This action can be as simple as pressing a push button on the stock card of the article in question. In this simple action, the employee has placed an order for the right product at the predetermined quantity. Nothing else needs to be done by the employee for placing the order.

First, a plurality of stock cards are prepared. Each stock card comprises a machine readable tag, such as a passive Radio Frequency Identification (RFID) tag, an active RFID tag or any other present or future machine readable tag. Each stock card is initially configured to identify a predetermined quantity of a predetermined article, for example, 500 pads of a certain size from a certain manufacturer. Any data on the stock card may be configurable.

The stock card has an Electronic Paper Display (EPD) panel adapted for displaying article packaging information. EPD refers to any present or future display technology that does not require an active power supply in order to display data.

The stock card also comprises one or more state switches for selecting different states. There is always at least one state for placing an order for the article with a predetermined quantity. An additional state can signal, for example, placing an urgent order. Other states can be configured as needed if necessary. The state switch can be any combination of mechanical/electronic mechanisms for selecting a state: only mechanical, only electronic or both mechanical and electronic state switch. The state switch can be, for example, a push button, a mechanical lever etc.

The stock cards of this disclosure are removably attached to the article packaging they identify. Typically the employee in the supply room visually inspects the article packaging to decide which articles need to be ordered. When the employee determines that a certain article needs to be ordered, the employee applies the appropriate state switch for placing an order.

After a state has been selected, the current (selected) state should be visible. For example, a LED indicator might be activated near the button pushed. In case of a mechanical lever, each position of the lever should have an indication to the state the position applies to. Alternatively, the state is displayed on the display panel.

One or more tag readers are placed in the supply room, for example, in the ceiling Once a state of a stock card has been selected, the stock card initiates a wireless communication to the tag reader who reads the machine tag which indicates the new state of the stock card.

The stock card can send and receive communications and the display can thus be controlled remotely, for example, by the fulfillment server. The display can be used to display any desired information about the article itself and/or the order status. Such information that can be controlled remotely include, for example, one or more of the following items: article name, price, number of units to be ordered, manufacturer name, catalog number, storage location in the supply room, barcode, article description, photo of the article, the date an order was placed, status of order, or date the order is expected to be fulfilled. Thus, if for example, the price of an article in a retail store needs to be changed, sending a command to the stock card will update the article price displayed. If a stock card is removed from one article to another (different) article, the stock card can be programmed to display information for the new article. The stock card may also be controlled locally, for example, by an employee on location, via any device that can transmit the appropriate instructions wirelessly to program the stock card and the information it displays.

Reference is now made to FIG. 1 showing block diagram of an embodiment of a stock card 100. The stock card comprises a power source 110 (such as a battery or any alternative power source), connected to a controller 120. Any appropriate controller can be used for stock cards and staff tags, for example, the STM32L152RBH6 by STMICROELECTRONICS of 39, Chemin du Champ des Filles-Plan-Les-Ouates, Geneva, Switzerland; PIC24FJ128GA308-I/PT, PIC24FJ64GA102-I/M or PIC24FJ64GA104-I/ML by Microchip Inc. of 2355 West Chandler Blvd., Chandler, Ariz. 85224-6199, U.S.A.

The controller 120 is connected to and operates the EPD display 130, the UHF unit 140 and Low Frequency (LF) unit 150. The controller 120 is connected to the different sensors if present, showing here a temperature sensor 160 and a motion sensor 170.

Figure 2:
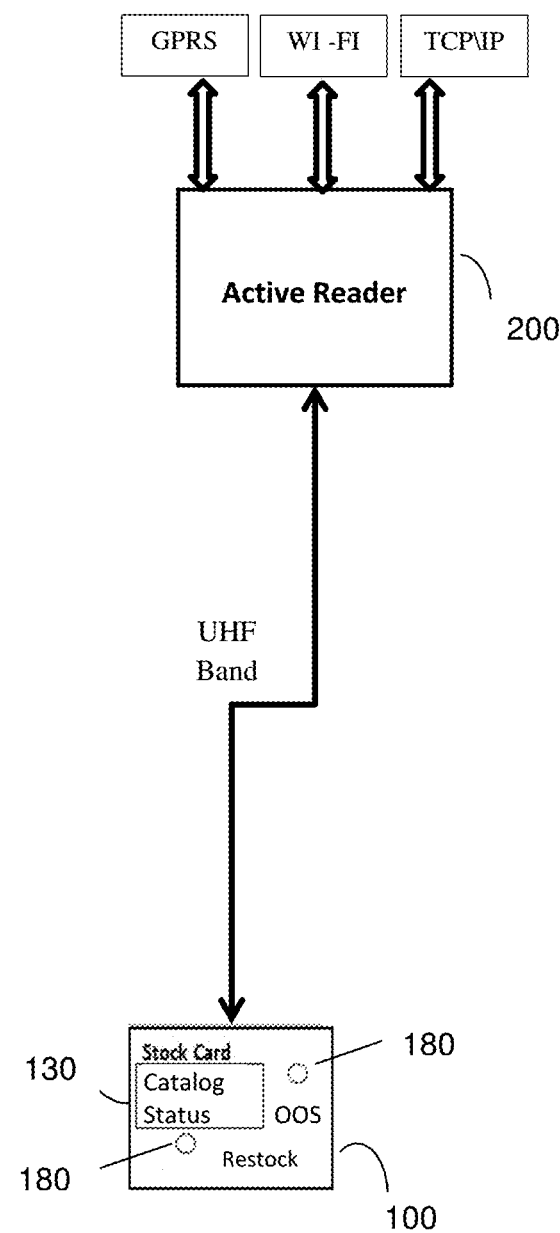
FIG. 2 shows a block diagram of a stock card connected to an active reader.

Reference is now made to FIG. 2 showing a block diagram of a typical stock card 100 wirelessly connected to an active reader 200. The stock card 100 comprises one or more state switches 180, one state switch 180 is used to place for placing an order of the predetermined amount of the articles associated with the stock card, while the additional state switches 180 can be used for additional purposes such as for placing an urgent order for the same article. The stock card 100 further comprises a display panel 130 such as an Electronic Paper Display (EPD) panel used for displaying selected information regarding the article associated with that stock card 100. Such information can include: article name, article product number, order status, date an order was placed, date order should be fulfilled, supplier details and any other relevant information.

The stock card 100 further comprises a machine readable tag (not shown) connected to the one or more state switches 180. The machine readable tag can be a Radio Frequency Identification (RFID) tag of the art or any existing or future technology for wireless communication for short distances (typically from one to one hundred meters).

The machine readable tag is wirelessly connected to an active reader 200 via a wireless channel, for example, the Ultra-High Frequency (UHF) band (any other wireless band can also be used).

The active reader 200 also has communication capabilities to connect to external systems, for example, via protocols such as TCP/IP, WiFi, GPRS, UMTS and any existing or future communication protocol are considered to be encompassed.

Figure 3:
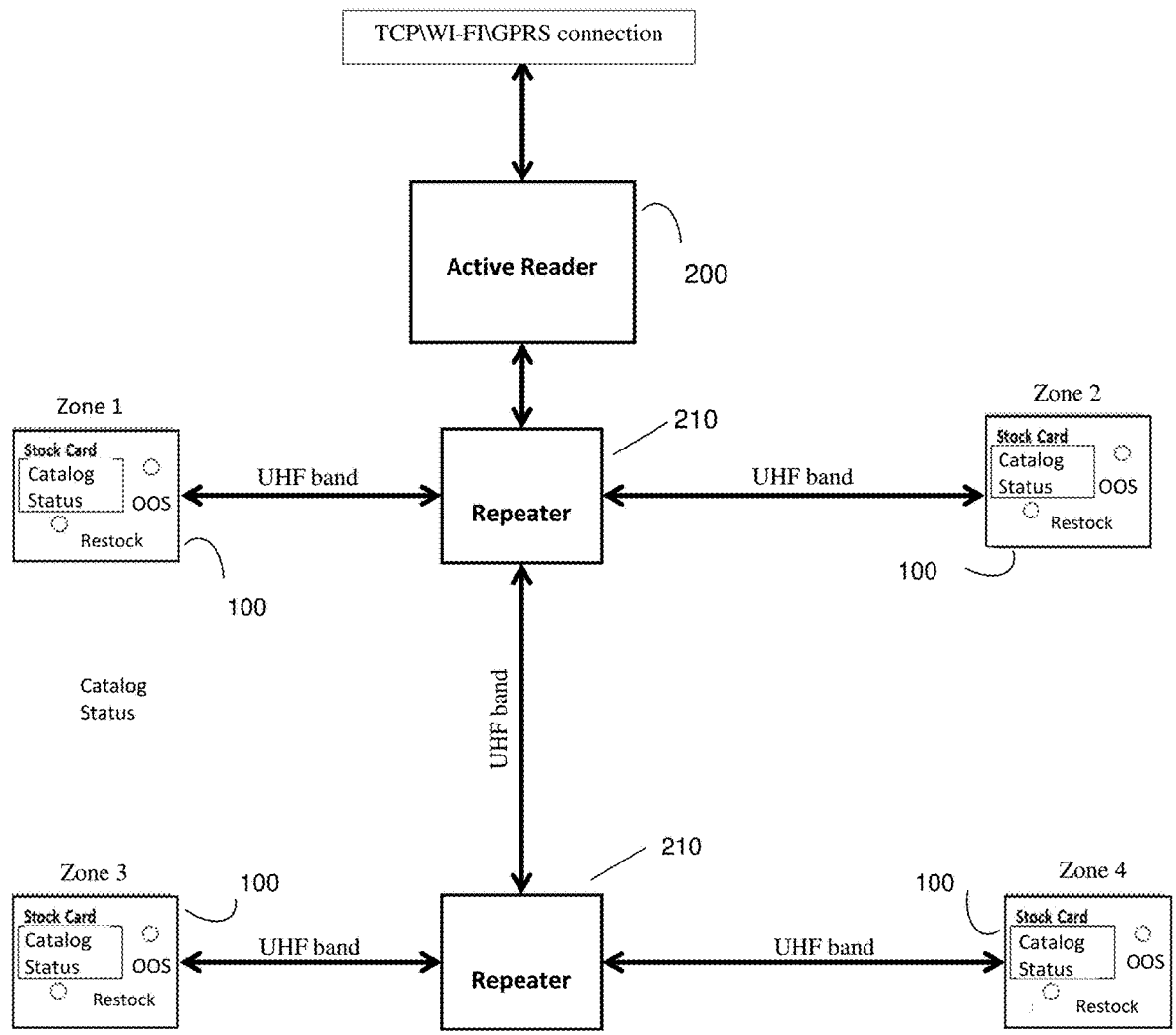
FIG. 3 shows a block diagram of a several stock cards connected to an active reader.

An active reader 200 can be associated with a plurality of stock cards 100. Some of the stock cards 100 may not be in range to adequately communicate with the active reader 200. FIG. 3 shows a block diagram of a typical configuration where stock cards 100 communicate with the reader 200 via one or more repeaters 210. A repeater 210 receives a communication from a stock card 100 and repeats/transmits it again. The outgoing transmission from the repeater 210 is then either received by the active reader 200 or by another repeater 210 than transmits the message again until the message arrives to the active reader 200. The exact same process is also applicable for a communication originating from the active reader 200 and destined to a stock card 100 that is out of range. Such a communication also travels via one or more repeaters 210.

In some embodiments the active reader 200 is mobile device such as a mobile telephone, a tablet, an iPad or any similar device. The mobile device can read a stock card 100 using any wireless technology, for example, Near Field Communication (NFC). When using NFC, the user can simply touch the stock card 100 with the mobile device in order to read it.

Figure 4:
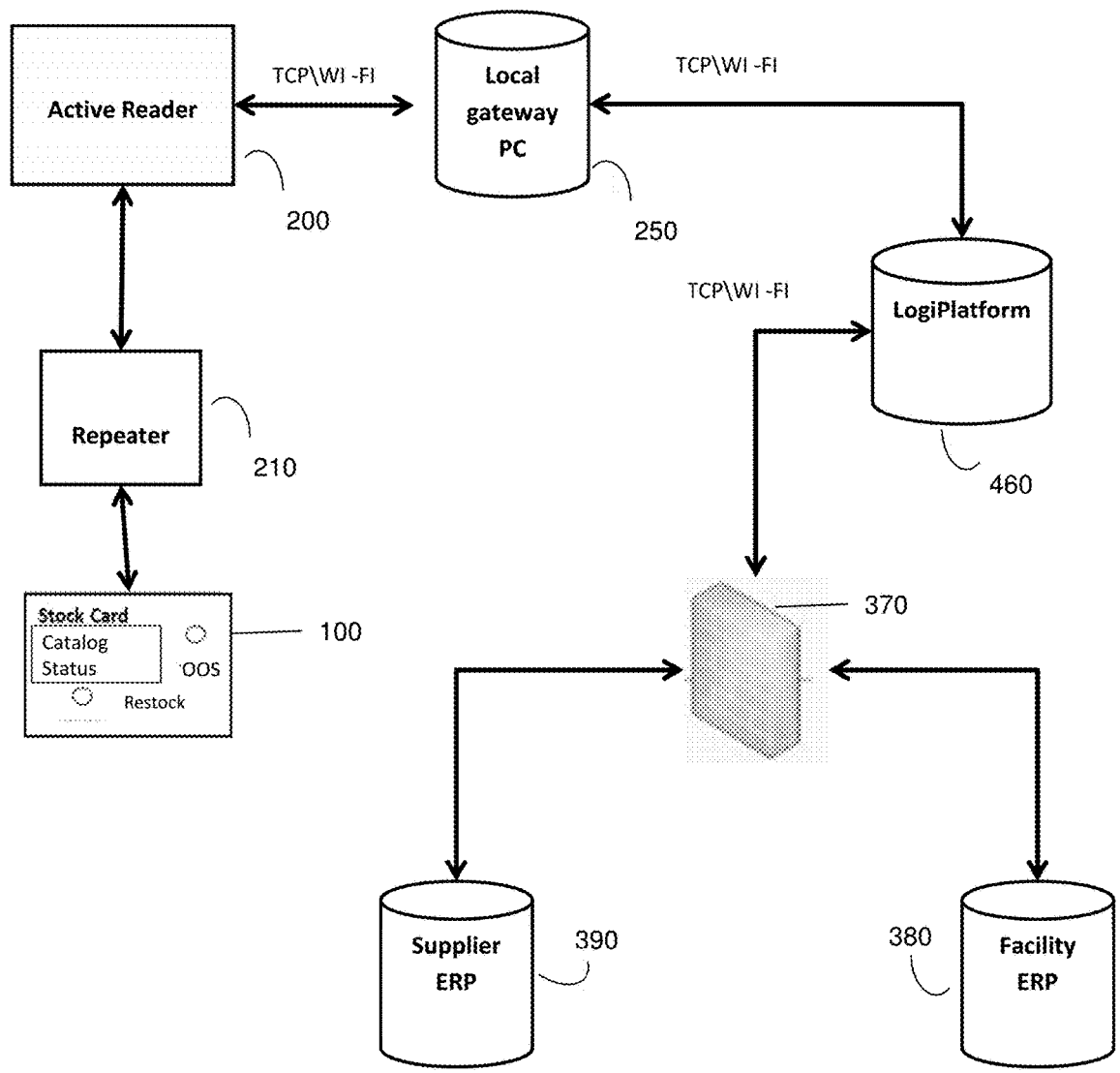
FIG. 4 shows a block diagram of a local installation of a system.

Reference is now made to FIG. 4 showing a block diagram of a local installation of an embodiment of a reordering system. Each active reader 200 of the same facility is connected to a local gateway 250 via wired and/or wireless communication channels, typically, via wireless communications such as TCP/IP, WiFi, GPRS, UMTS or any other wireless protocol. The local gateway 250 is then connected to the fulfillment server 460. In a local installation, the fulfillment server 460 is located within the facility's network and inside the firewall 370. The fulfillment server 460 then receives the order to be fulfilled and transmits it accordingly either to the facility's Enterprise Resource Planning (ERP) 380 server or directly to the supplier's ERP server 390. The fulfillment server (ordering platform) 460 is configured to send an order either directly to the supplier's ERP server 390 or to the facility's ERP 380 server which then processes the orders independently.

The local gateway 250 is an optional device and a local installation can also have the active readers 200 directly connected to the fulfillment server 460. The local gateway 250 is useful when a direct connection is established between the active readers 200 and a fulfillment server 460 that resides outside the facility's firewall 370. In such a scenario, there a single connection (IP address) established between the local gateway 250 and the fulfillment server 460 and there is no need to establish multiple connections directly to each active reader 200.

The local gateway 250 is connected to one or more tag readers 200 (via any communication mean, wired, wireless or both) and receives from the tag readers 200 article orders to be fulfilled. The orders are then processed and transferred to a fulfillment server 460. The fulfillment server 460 can be a central server of the facility which in turn communicates with the right supplier server 380 for placing an order. Alternatively, the fulfillment server 460 can be the supplier server 390 and thus the fulfillment server 460 is also able to place direct orders with suppliers. The fulfillment server 460 can communicate with the supplier's ERP server 390 or to the facility's ERP server 380 either in real time or close to real time where an order received is immediately or very quickly processed and transmitted to the fulfillment server. Alternatively, the fulfillment server 460 can communicate the orders to the supplier's ERP server 390 or to the facility's ERP server 380 in predetermined points such as: once a day, once the quantity of orders reaches a predetermined threshold etc. The system administrator can configure the ordering system according to the chosen ordering rules selected for each article and/or supplier.

When the active reader 200 is a mobile device, the user can further use the mobile device for additional operations, such as:
1. Place an order with the fulfillment server 460, for example, using PAR or KANBAN inventory management systems;
2. Query the fulfillment server 460 for the status of an order;
3. Send and receive messages, for example, between a nurse in a hospital and material management;
4. Change the description and information of a stock card 100; and
5. Request simple reports, for example, orders per period, orders per product etc.

Figure 10:
FIG. 10 shows an example of a main screen of a mobile phone application.

FIG. 10 shows an example of a mobile phone application 1000 menu showing how the user can access operations 1-4 described above.

In some embodiments, it may be useful to be able to place an urgent order to be delivered as soon as possible as opposed to the normal delivery delay. This can be achieved by selecting a dedicated state 180, urgent order, on the stock card 100.

Figure 5:
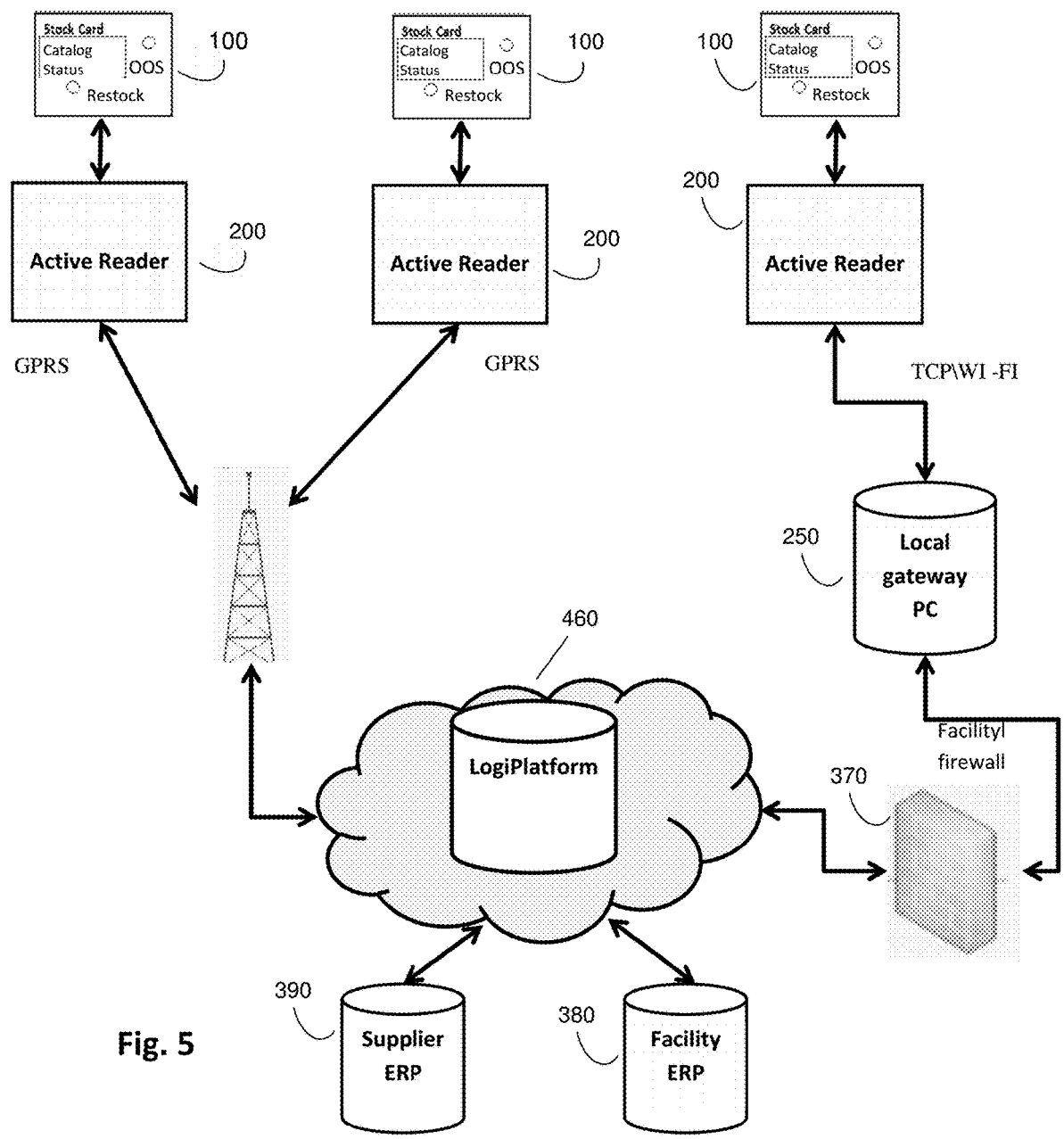
FIG. 5 shows a block diagram of a cloud/server installation of a system.

Alternatively, FIG. 5 shows a block diagram of a cloud-based embodiment of an ordering system. In a cloud-based configuration, the ordering platform 460 is located in the cloud (Internet network) outside the firewall 370 of the facility. Each active reader 200 can be configured to communicate either with the local gateway 250 or directly with the fulfillment server 460 typically over wireless communications (GPRS shown, but any other wireless or wired communication protocol can be used). The fulfillment server 460 is configured to send an order either directly to the supplier's ERP server 390 or to the facility's ERP 380 server which then processes the orders independently.

The fulfillment server 460 can be located either inside the facility's firewall 370 or outside facility's firewall 370.

Figure 6:
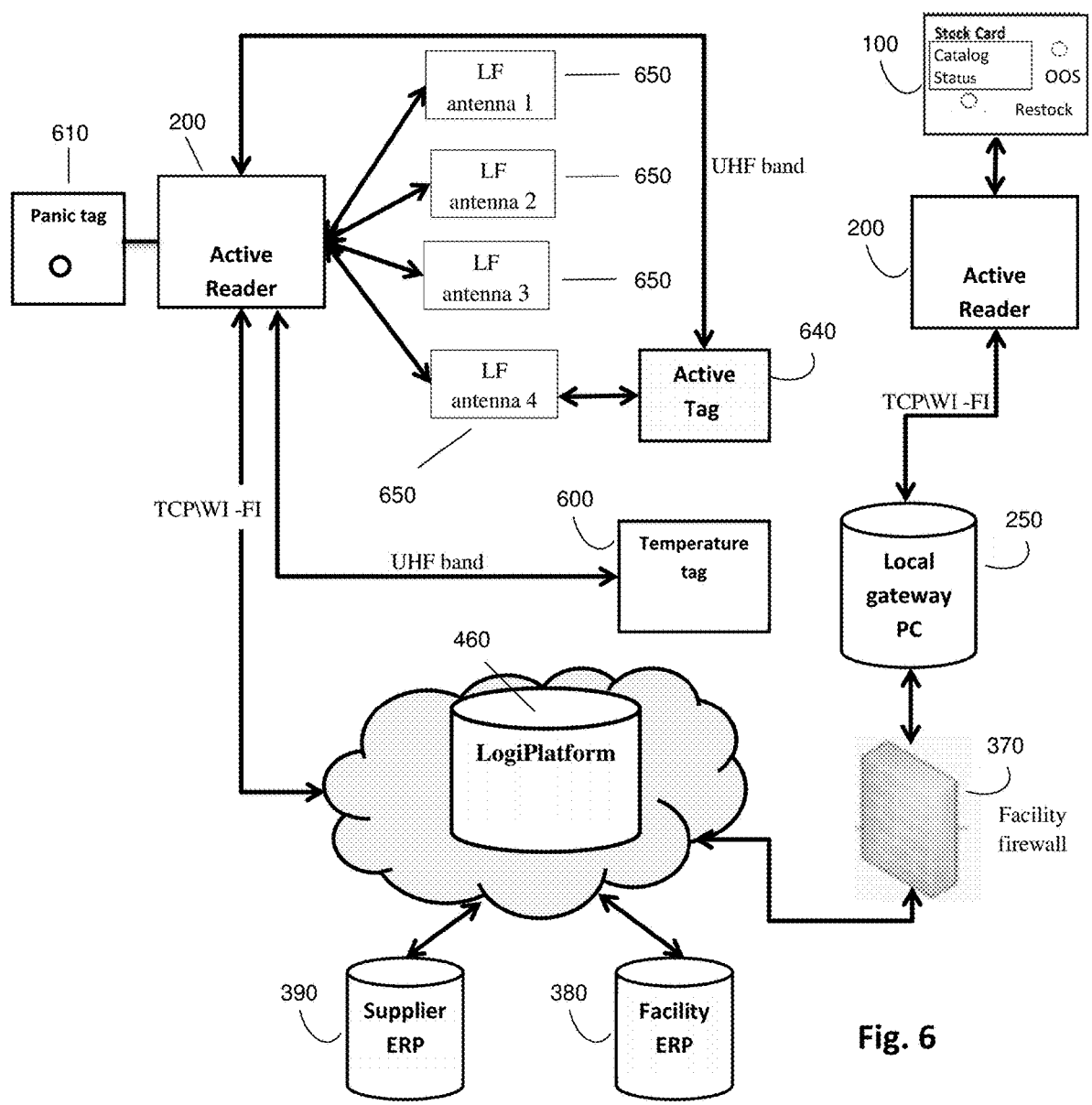
FIG. 6 shows a block diagram of an inventory and Real-Time Locating System (RTLS).

FIG. 6 is a block diagram of an embodiment of an inventory and Real-Time Locating System (RTLS). In some embodiments, the stock card 100 can integrate sensors in order to control the inventory. FIG. 6 shows a temperature sensor 600 that can measure the temperature at predetermined times (or continuously) and issue an alert if the temperature is outside a predetermined range. Additional sensors can include, for example, a motion sensor (not shown) to detect if an article is being moved outside the authorized hours. A humidity sensor can also be implemented to monitor humidity in the place of inventory.

In an RTLS implementation, it is necessary to track inventory and identify the location of a any article or person. Such tracking is achieved by attaching (wearing for a person) an active tag 640 to an object or person. The active tag 640 is then read by a low-frequency (LF) antenna 650 in proximity, and the location of the active tag 640 is then identified as being in the area of the LF antenna 650, for example, room 5, hangar 12, storage room number 7, a shelf of a retail store etc. The location of the active tag 640 is then transmitted to the active reader 200, and thus the position of the active tag 640 is then transmitted to the fulfillment server 460.

An employee may have a panic tag 610 on his staff tag. The staff tag is read by the nearest active reader 200. When the employee has an emergency situation, pressing the panic tag 610 on his staff tag will generate a call for help transmitted by the active reader 200 to the appropriate emergency contact point. The communication identifies the active reader 200 which read the staff tag, thus help will be sent to the location of that active reader 200.

The panic tag 610 refers to any tag worn by a staff person and which can communicate with the active reader 200 to send and receive information, for example, the employee can request any information provided by a sensor (temperature, humidity read etc.) or the employee may send instructions.

Figure 7:
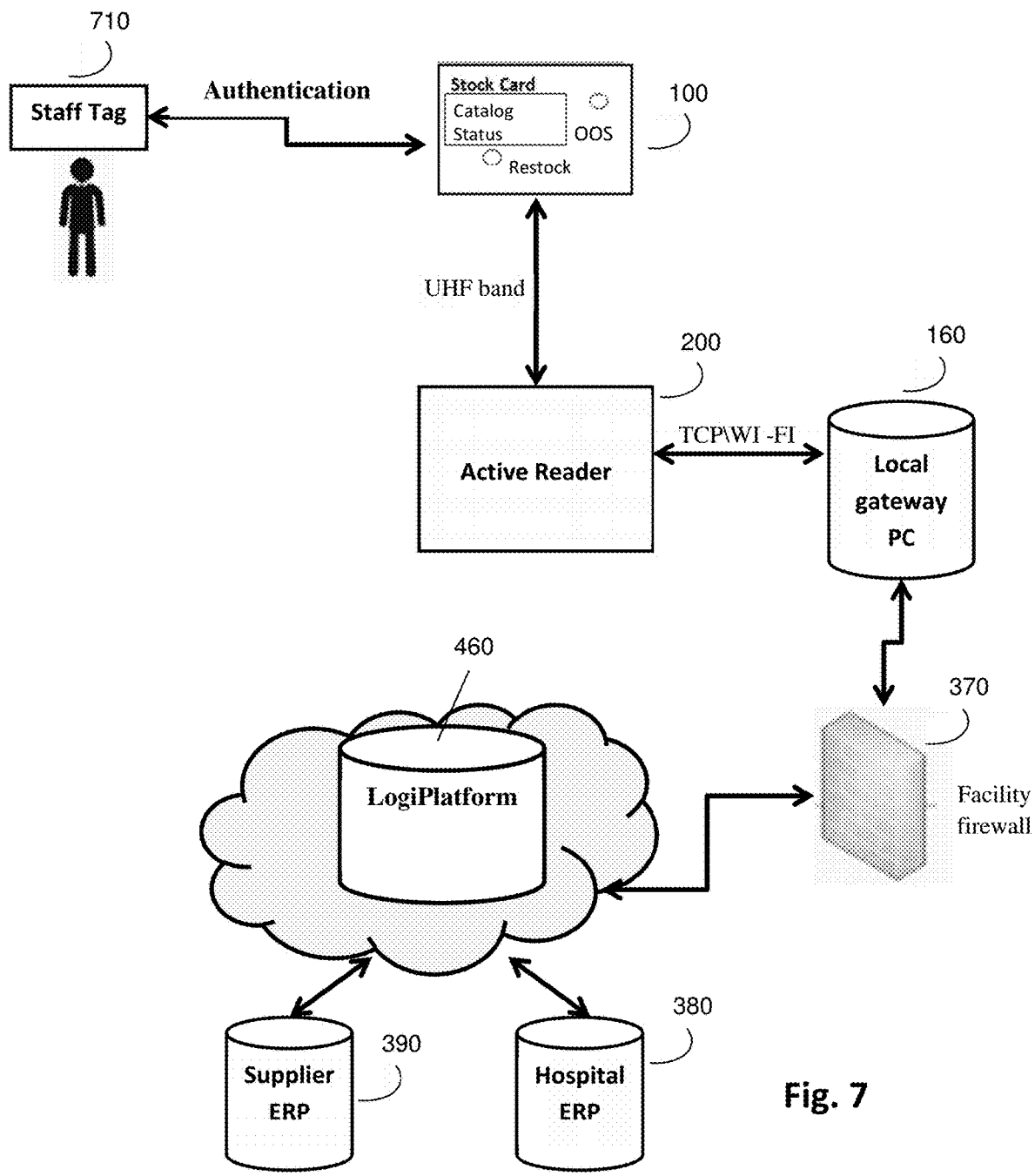
FIG. 7 shows a block diagram of a staff tag communicating with a stock card.

FIG. 7 is a block diagram showing the process of an employee placing an order for an article. When an employee wishes to order a predetermined quantity of an article, the employee, wearing his staff tag 710 approaches the stock card 100. The stock card 100 tag reader reads the machine readable tag of the staff tag 710 and thus identifies and authenticates the employee. Thus when the employee activates any reordering state 180 in the stock card 100, the order is transmitted containing information about the employee who initiated the order. The fulfillment server 460 can then verify that the employee is authorized to perform the order before confirming the order.

Figure 8:
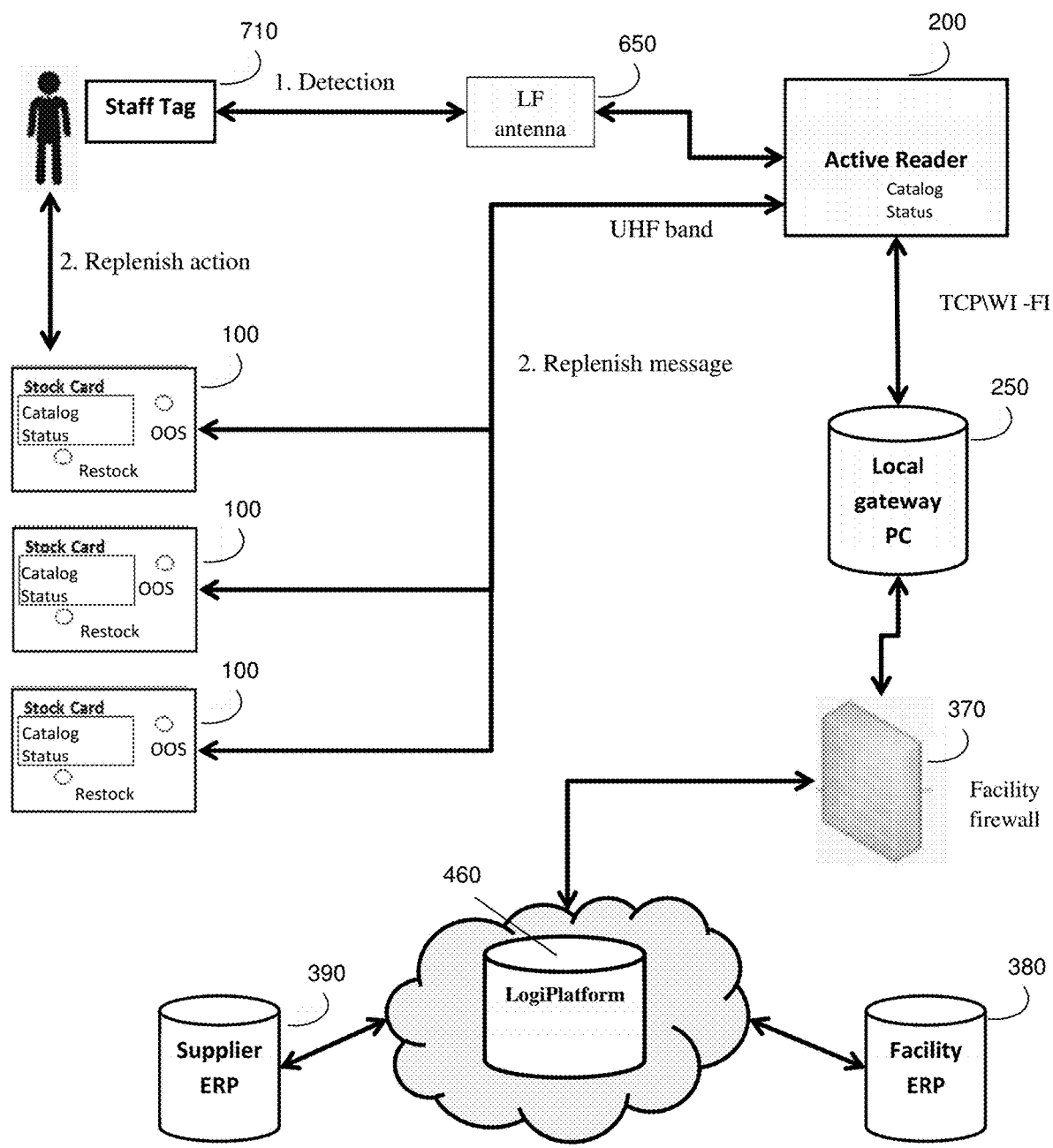
FIG. 8 shows a block diagram of the article reordering process.

FIG. 8 shows a block diagram of a replenish activity where an employee, wearing a staff tag 710, fulfils an order and brings the requested articles to the place of inventory. The staff tag's 710 LF antenna 650 connects to the active reader 200 at the place of inventory and thus the employee's location is identified (location of active reader 200 reading the staff tag 710).

Figure 9:
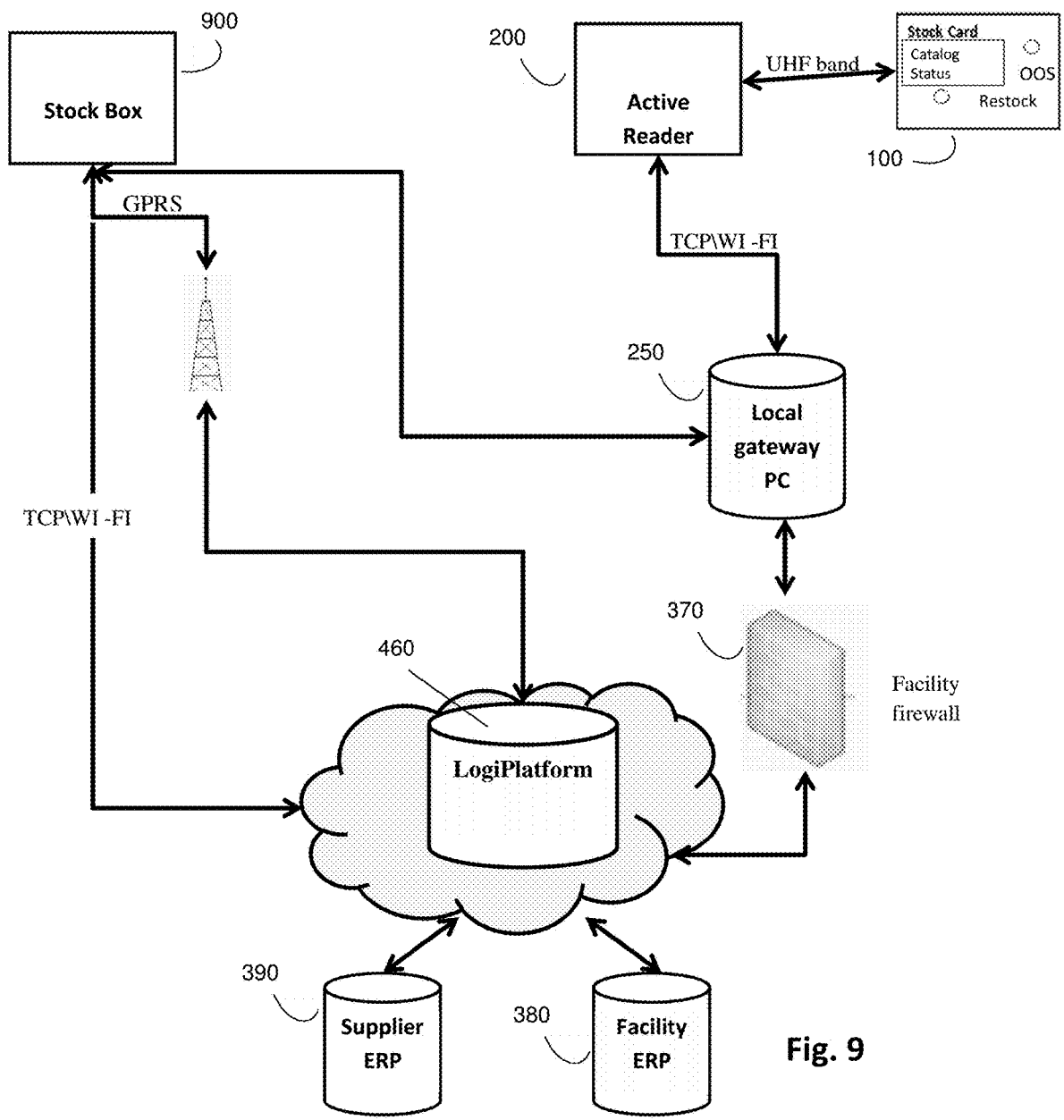
FIG. 9 shows a block diagram of a stock card together with a stock box system.

The employee proceeds to place the ordered articles at their location and then selects the associated stock card 100 and activates the appropriate state switch 180 to signal that the ordered articles have been delivered. The stock card 100 then initiates communication with the active reader 200 to report the article delivery. The active reader 200 then reports the article delivery by the employee to the fulfillment server 460 who then reports the fulfillment either to the supplier's ERP server 390 or to the facility's ERP 380 server FIG. 9 is a block diagram showing the stock card 100 ordering system working in conjunction with other ordering systems on the same facility and/or network, for example, a Stock Box ordering system 900 as disclosed in U.S. patent application Ser. No. 13/623,191. Both ordering means 100, 900 can communicate with the same fulfillment server 460 and thus inventory can be managed coherently.

LIST OF NUMERALS USED IN THE DRAWINGS

100 Stock card
110 Power source

120 Controller
130 Display
140 UHF unit
150 LF unit
160 Temperature sensor
170 Motion sensor
180 State switch
200 Active reader
210 Repeater
250 Local gateway
370 Firewall
380 Supplier ERP
390 Facility ERP
460 Fulfillment Server (marked as "LogiPlatform")
600 Temperature sensor
610 Panic tag
640 Active tag
650 LF antenna
710 Staff tag
900 Stock Box Many alterations and modifications may be made by those having ordinary skill in the art without departing from the spirit and scope of the disclosure. Therefore, it must be understood that the illustrated embodiment has been set forth only for the purposes of example and that it should not be taken as limiting the disclosure.

For example, notwithstanding the fact that the elements of a claim are set forth below in a certain combination, it must be expressly understood that the disclosure includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element is explicitly contemplated in some instances.

The words used in this specification are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A computerized system for ordering and receiving articles in a point of inventory, the system comprising:
   a. a plurality of stock cards, each stock card comprising:
      i. a machine readable tag, configured to be removably attached to an article packaging and associated with a predetermined ordering quantity of said article;
      ii. an Electronic Paper Display (EPD) panel adapted for displaying article information on each stock card without requiring an active power supply to display data;
      iii. one or more state switches for selecting at least one state for placing an order for said articles;
      iv. a power source;
      v. a wireless transmission unit; and
      vi. a controller connected to said machine readable tag, power source, wireless transmission unit and EPD panel;
   b. at least one active reader for wirelessly reading said machine readable tags; and
   c. a fulfillment server comprising a processor and memory units connected to said at least one active reader for receiving orders to be fulfilled from the machine readable tags of the stock cards and transferring said orders to be fulfilled to a fulfillment server,
   wherein when an employee wishes to order a predetermined quantity of an article the employee deploys the state switch on the stock card to indicate placing an order, the machine readable tag of the stock card then automatically transmits an order for the quantity and article associated with the stock card to the fulfillment server which processes the order and sends for execution with a supplier.

2. The system according to claim 1, wherein said machine readable tag is a passive Radio Frequency Identification (RFID) tag.

3. The system according to claim 1, wherein said machine readable tag is an active RFID tag.

4. The system according to claim 1, wherein the one or more state switches comprise two states: one for placing an order to be fulfilled for a certain quantity of a product, and the other for placing an urgent order to be fulfilled for a certain quantity of a product.

5. The system according to claim 1, wherein the one or more state switches are push buttons.

6. The system according to claim 1, wherein the one or more state switches comprise a visual indicator to indicate the selected state.

7. The system according to claim 1, wherein the one or state switches can be reset after an order is fulfilled.

8. The system according to claim 1, wherein the at least one tag reader is connected to the fulfillment server via a wired or wireless connection or both.

9. The system according to claim 1, wherein the person delivering the fulfilled product to the supply room first identifies himself before changing the state of the one or more state switches.

10. The system according to claim 9, wherein said person identifies himself by having his personal card authenticate itself to a stocking card.

11. The system according to claim 1, wherein a stock card can be configured remotely.

12. The system according to claim 1, wherein the article information displayed on the EPD panel comprises one or more of the following items: article name, price, number of units to be ordered, manufacturer name, catalog number, storage location in the supply room, barcode, article description, photo of the article, the date an order was placed, status of order, or date the order is expected to be fulfilled.

13. The system according to claim 1, wherein the fulfillment server sends orders to a facility server and the facility server sends the orders to the appropriate suppliers.

14. The system according to claim 1, wherein the at least one active reader is a mobile device.

15. The system according to claim 14, wherein said mobile device is a mobile telephone, a tablet or an iPad.

16. A computerized method for ordering and receiving articles in a supply room of a facility, the method comprising the steps of:
 a. configuring a plurality of stock cards each to identify a predetermined quantity of a predetermined article, each stock card comprising:
  i. a machine readable, configured to be removably attached to an article packaging and identify a predetermined ordering quantity of said article;
  ii. an Electronic Paper Display (EPD) panel adapted for displaying article information on each stock card without requiring an active power supply to display data;
  iii. one or more state switches for selecting at least one state indicating placing an order for said article;
  iv. a power source;
  v. a wireless transmission unit; and
  vi. a controller connected to said machine readable tag, power source, wireless transmission unit and EPD panel;
 b. reading said machine readable tags wirelessly by an active reader; and
 c. automatically transmitting said order to a fulfillment server comprising a processor and memory units connected to said active reader, and further transferring said orders to be fulfilled to a supplier,
 wherein when an employee wishes to order a predetermined quantity of a product the employee deploys the state switch on the stock card to indicate placing an order, the machine readable tag of the stock card then automatically transmits an order for the quantity and article associated with the stock card to the fulfillment server which processes the order and sends it to a supplier.

17. The method according to claim 16, wherein the active reader is a mobile device.

18. The method according to claim 17, wherein said mobile device is a mobile telephone, a tablet or an iPad.

19. A computerized system for ordering and receiving articles in a point of inventory, the system comprising:
 a. a plurality of stock cards, each stock card comprising:
  i. a machine readable tag, configured to be removably attached to an article packaging and associated with a predetermined ordering quantity of said article;
  ii. an Electronic Paper Display (EPD) panel adapted for displaying article information on each stock card without requiring an active power supply to display data;
  iii. one or more state switches for selecting at least one state for placing an order for said articles;
  iv. a power source;
  v. a wireless transmission unit;
  vi. a controller connected to said machine readable tag, power source, wireless transmission unit and EPD panel; and
  vii. a motion sensor;
 b. at least one active reader for wirelessly reading said machine readable tags; and
 c. a fulfillment server comprising a processor and memory units connected to said at least one active reader for receiving orders to be fulfilled from the machine readable tags of the stock cards and transferring said orders to be fulfilled to a fulfillment server,
 wherein when an employee wishes to order a predetermined quantity of an article the employee deploys the state switch on the stock card to indicate placing an order, the machine readable tag of the stock card then automatically transmits an order for the quantity and article associated with the stock card to the fulfillment server which processes the order and sends for execution with a supplier.

20. The system according to claim 19, wherein said motion sensor detects if an article is being moved outside authorized hours.

* * * * *